UNITED STATES PATENT OFFICE.

WILHELM ACKERMANN, OF WILMERSDORF, NEAR BERLIN, GERMANY.

PROCESS FOR COATING THE SURFACES OF VESSELS.

No. 881,759.          Specification of Letters Patent.        Patented March 10, 1908.

Application filed June 10, 1907. Serial No. 378,301.

*To all whom it may concern:*

Be it known that I, WILHELM ACKERMANN, chemist, a subject of the German Emperor, residing at Pariserstr. 55, Wilmersdorf, near Berlin, Germany, have invented a new and useful process for coating the surfaces of vessels, particularly fermenting vessels for breweries, with a material capable of resisting the corroding action of fermenting beer-wort or other liquids; and I do hereby declare the following to be a full, clear, and exact description of the same.

In the brewing industry efforts have been recently made to substitute metal for wood in the construction of the various vessels used, as for certain reasons metallic vessels are preferred. As, however, the metal is apt to corrode in the presence of the fermenting wort and the metal is consequently dissolved by the beer, steps must be taken to prevent this occurring. Coating the vessels with lacquer, varnish or the like does not suffice; enameling is very dear and has besides the disadvantage that small cracks or injuries to the enamel cannot be repaired, and in the case of such injuries occurring to the enameled vessel, it is necessary to re-enamel the whole vat.

According to the present invention, all these disadvantages are overcome and a cheaper and more durable coating obtained, as the surfaces to be protected are covered with a lining of porous but firm material, preferably of woven or closely felted animal, vegetable, metal or mineral threads or fibers or even leather, and these linings are soaked through with paraffin, wax, resin, stearic acid, india rubber, oil varnish or like substances giving resistance to the material and rendering the coating watertight and resisting.

Preferably the process is practically carried out as follows:—

The walls of the vessel are carefully covered with starch paste and the tissue applied. The most suitable material is thick fustion or the so-called English leather. After heating the vessel, the dried lining or coating is thoroughly saturated with any suitable substance or material (such as above mentioned) that will render the lining impervious to the chemical action of the beer or liquids. When dry, this lining is firm and hard and will be quite impervious to and unaffected by the various brewing liquids.

Brushing such as is usual in the brewing industry does not injure this coating, and furthermore but very little brushing is necessary as the impurities only loosely adhere to the smooth walls and can easily be removed. If the lining has been soaked with a substance, which at least in the cold condition is not acted on by corrosive alkalies, then any adhering fermenting or resinous residues can easily be removed by washing with alkaline liquids and rinsing out with water.

Such coatings can only be mechanically injured, in which case they can be easily and quickly repaired after cleaning and drying the injured spot, with a hot iron, or at the worst, by inserting a patch.

The wooden vessels used in brewing may also be coated in this manner instead of the usual pitching, varnishing or paraffining. This coating offers special advantages for rectangular vessels made of wooden planks, in which the coating not only serves to protect the walls of the vessel but insures the proper calking of the joints.

The above described process is suitable for coating the surfaces of all kinds of vessels, for example, dyeing vats and the like.

If the fabric lining is soaked in a substance or substances melting at a high temperature, then vessels thus coated may be used for treating or containing even hot liquids.

Having now particularly described and ascertained the nature of my said invention and in what manner the same is to be performed, I declare that what I claim is:

The herein described process for coating wooden fermenting vats for brewing, consisting in coating the surface to be protected with a suitable adhesive, then applying a porous lining to the same, then impregnating this lining with a material melting at a low temperature like paraffin, ozocerite, ceresin, wax, resin, pitch, stearic acid, oil varnish, caoutchouc and the like, and capable of resisting the effects of fermenting beer wort, and other liquids containing acids, said material being applied to the lining in a heated molten condition.

In witness whereof I have hereunto set my hand in presence of two witnesses.

WILHELM ACKERMANN.

Witnesses:
     MAURICE LILIENFELD,
     EMIL PAPENBRUCH.